Patented July 13, 1937

2,087,066

UNITED STATES PATENT OFFICE 2,087,066

DRAWING OR EXTRUSION DIE

Joseph G. Nadler, Jr., Jersey City, N. J.

No Drawing. Application April 2, 1935,
Serial No. 14,275

3 Claims. (Cl. 18—47)

This invention relates to improvements in die slab material and to a method of making the same.

It is an object of the invention to provide improved die slab material for use in extruding and drawing dies such as are commonly employed in extruding graphite, crayon, rubber, and other plastic materials, and for drawing metal wire. Heretofore, die slabs made of natural corundum and natural and synthetic sapphire have been employed, and my invention provides an improved and inexpensive material to replace these materials.

It is a further object of my invention to provide an improved method for manufacturing die slabs and die slab material of the above character.

In addition to the above mentioned objects and purposes, it is an object of my invention to provide improved material for use in wire guides of the type employed on coil winding machines for the manufacture of filaments for incandescent lamps.

My improved material is generally non-metallic in character and is produced by fusing a suitable granular mineral and a granular carbide in such a manner as to produce a compact solid mass capable of taking on a relatively high polish. In the manufacture of die slabs for use in extruding graphite or drawing wire and in the manufacture of wire guides, I preferably employ a non-metallic binder which is thermoplastic in character to bind and fuse together the granular mineral and the granular carbide. I secure the desired results by forming my material of granular aluminum oxide, granular silicon carbide and biborate of soda in the following approximate proportions by weight of the finished mass:

|  | Per cent |
|---|---|
| Granular aluminum oxide | 55 |
| Granular silicon carbide | 5 |
| Biborate of soda | 40 |

I have found that satisfactory results are secured by making the material in small quantities, such as by mixing approximately 5½ ounces of the aluminum oxide with approximately ½ ounce of silicon carbide and approximately 4 ounces of biborate of soda to produce approximately 10 ounces of the finished material.

In the manufacture of my material the ingredients are mixed together and heated into a plastic or molten mass to approximately 1600 degrees Fahrenheit. After the materials have thus been mixed together and heated into a unitary plastic mass, the resultant mixture is permitted to cool. The material thus formed is a hardened mass and may be made into the desired shapes for use in extruding or drawing dies or wire guides by granulating the mass in a mortar, or other suitable container, and then placing it in molds in the desired size and shape, preferably made of graphite or carbon graphite and then heating the molds and the contents to approximately 1600 degrees Fahrenheit, when the material will once again become plastic. When the material has thus become plastic, it is subjected to pressure as by placing the mold in an ordinary hand operated arbor press, and the mass is thus permitted to cool under pressure. The pressure should preferably not be released until the graphite or carbon graphite mold changes color from red to black. After the mold and its contents have completely cooled, the graphite or carbon graphite mold is broken away from the hardened mixture, leaving the extruding or drawing die slab or wire guide of the desired shape and form.

For certain types of die slabs the silicon carbide may be omitted altogether and the remaining material, that is, the aluminum oxide and biborate of soda, will then be compounded and treated in the same manner as described above. However, in the manufacture of graphite or crayon extrusion dies or wire drawing dies or wire guides, it is very important that the material used should be of a type that is capable of taking on a very high polish, and for this purpose it is important that silicon carbide be added.

I claim:

1. In a drawing or extrusion die a die slab formed of a uniform hard and compact fused mass consisting of a mixture of aluminum oxide, silicon carbide, and biborate of soda, each of the ingredients of said mixture being evenly distributed throughout the mass.

2. In a drawing or extrusion die a die slab formed of a uniform hard and compact fused mass consisting of a mixture of aluminum oxide, silicon carbide, and 40% by weight of biborate of soda, each of the ingredients of said mixture being evenly distributed throughout the mass.

3. In a drawing or extrusion die or die slab formed of a uniform hard and compact fused mass, consisting of the following ingredients in approximately the following proportions by weight: 55% aluminum oxide, 5% silicon carbide, and 40% biborate of soda, each of the ingredients being uniformly distributed throughout the mass.

JOSEPH G. NADLER, Jr.